Oct. 17, 1961 H. A. MAYER 3,004,790
ARTICLE CARRIER FOR AN AUTOMOBILE TRUNK COMPARTMENT
Filed May 15, 1959 3 Sheets-Sheet 1
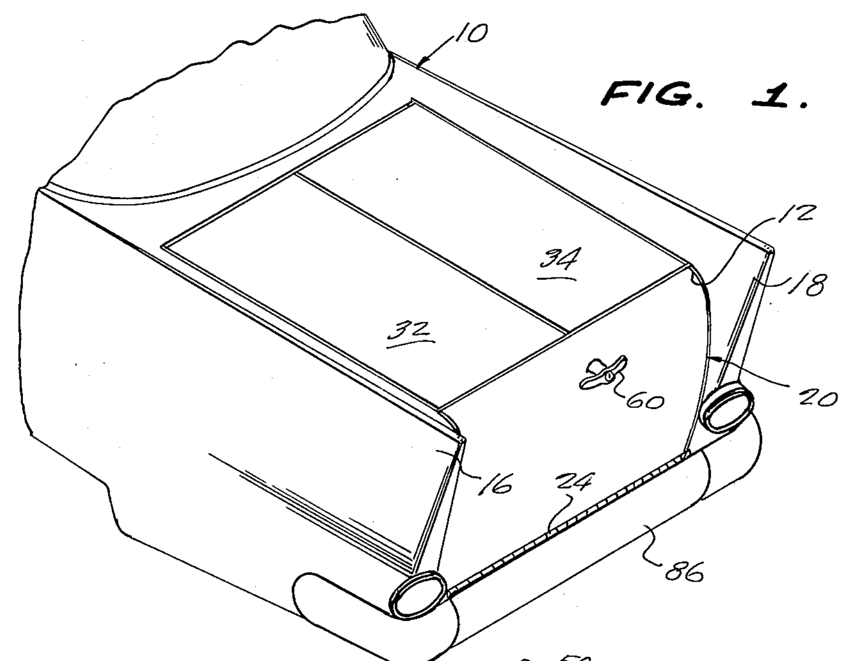
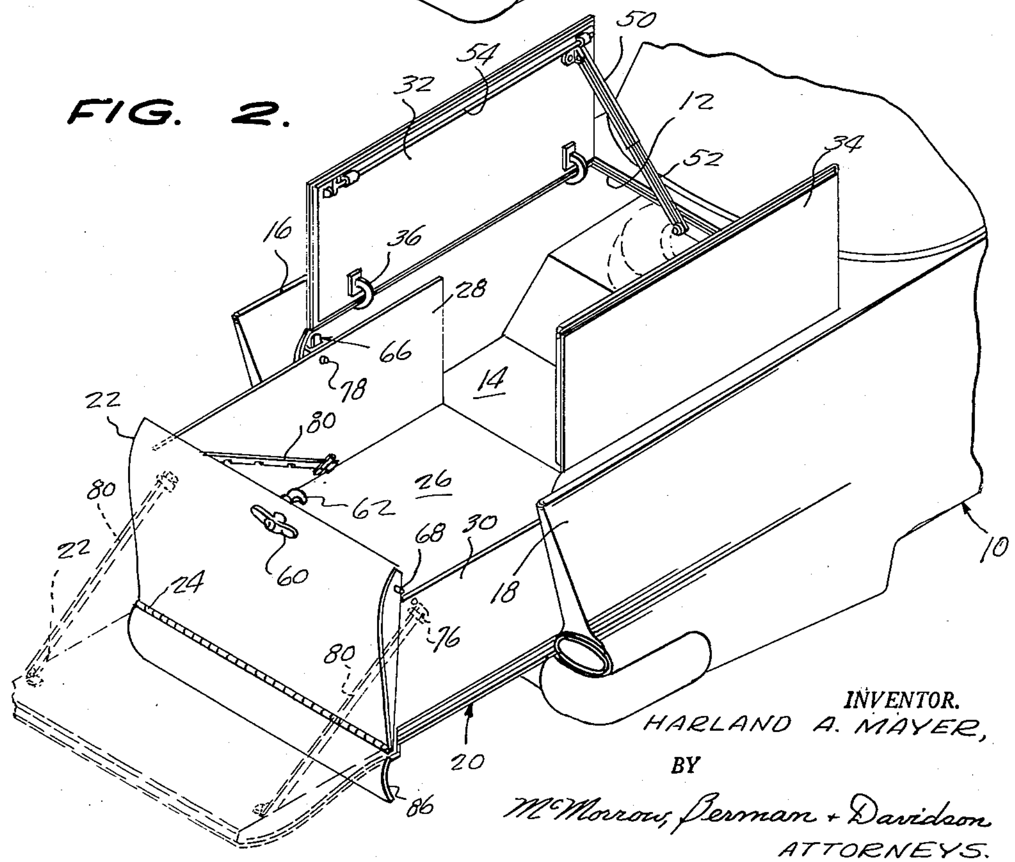
INVENTOR.
HARLAND A. MAYER,
BY
McMorrow, Berman + Davidson
ATTORNEYS.

ARTICLE CARRIER FOR AN AUTOMOBILE TRUNK COMPARTMENT
Filed May 15, 1959 3 Sheets-Sheet 2
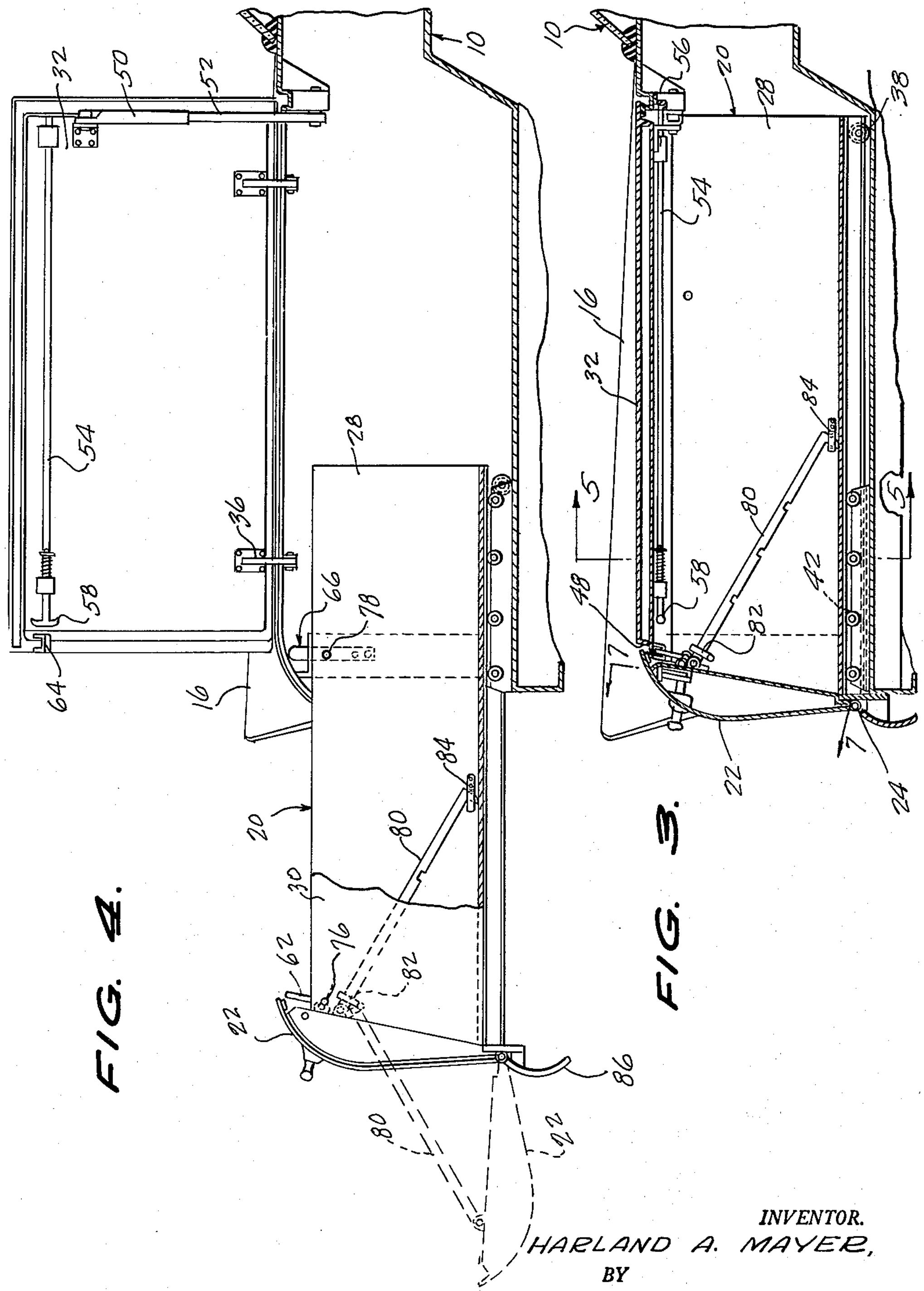

ARTICLE CARRIER FOR AN AUTOMOBILE TRUNK COMPARTMENT

Filed May 15, 1959 3 Sheets-Sheet 3

INVENTOR.
HARLAND A. MAYER,
BY
McMorrow, Berman + Davidson
ATTORNEYS.

United States Patent Office 3,004,790

Patented Oct. 17, 1961

3,004,790

ARTICLE CARRIER FOR AN AUTOMOBILE TRUNK COMPARTMENT

Harland A. Mayer, Hancock, Minn., assignor to Mar-May Development Corporation, Hancock, Minn., a corporation of Minnesota Filed May 15, 1959, Ser. No. 813,581
3 Claims. (Cl. 296—26)

The present invention relates to automobiles generally and in particular to an article carrier for an automobile trunk compartment.

Trunk compartments of passenger vehicles presently in use are provided with covers hinged at the forward ends and biased by spring means to open when the cover is unlocked. The cover of such a trunk compartment must be tied down when any bulky article is hauled in the trunk compartment if the article interferes with the closing of the trunk compartment cover. Even if tied down, frequently the cover of the trunk compartment interferes with the rear vision of the driver of the automobile. Such trunk compartments generally are of small size and bulky articles are not easily stored therein for transport.

An object of the present invention is to provide an article carrier for an automobile trunk compartment which is completely nested within the trunk compartment when not in use and which extends to a projected position rearwardly of the trunk compartment for carrying of relatively large and elongated articles therein.

Another object of the present invention is to provide an article carrier for an automobile trunk compartment which does not alter the external appearance of the automobile when in the nested position.

A further object of the present invention is to provide an article carrier for an automobile trunk compartment which has covers which in the raised position do not interfere with the rear vision of the driver of the automobile.

A still further object of the present invention is to provide an article carrier for an automobile trunk compartment which is sturdy in construction, one simple in structure, easily fabricated and assembled, one economically feasible, and one which is highly effective in action.

Figure 5:
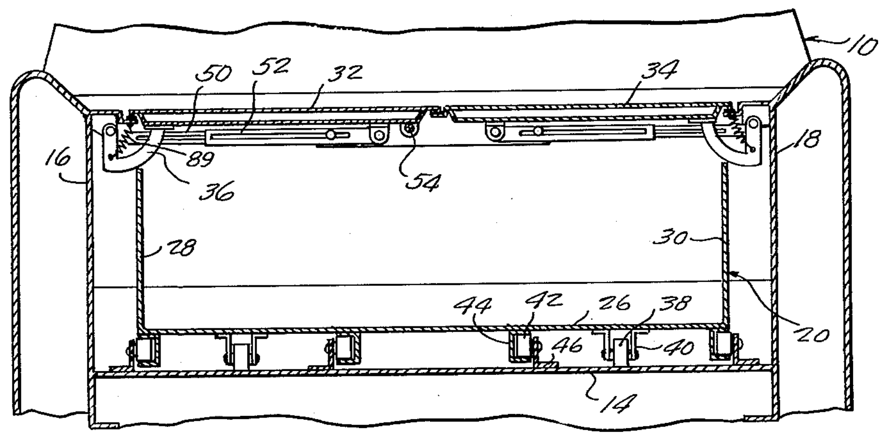
Figure 6:
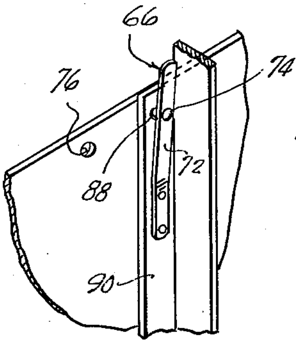
Figure 7:
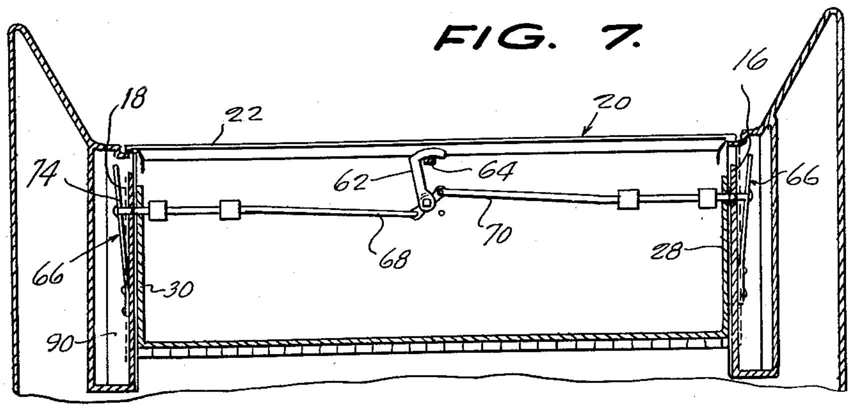

These and other objects and advantages of the present invention will be fully apparent from the following description when taken in conjunction with the annexed drawings, in which:

FIGURE 1 is an isometric view of the rear end of an automobile body showing the article carrier of the present invention installed therein and in nested condition, FIGURE 2 is an isometric view of the body shown in FIGURE 1, showing the article carrier of the present invention in extended condition, FIGURE 3 is a sectional view, as seen from the side of the assembly shown in FIGURE 1, FIGURE 4 is a sectional view, as seen from the side, of the assembly of FIGURE 2, FIGURE 5 is a view taken on the line 5—5 of FIGURE 3, FIGURE 6 is a fragmentary isometric view of one of the latch means employed with the article carrier of the present invention, and FIGURE 7 is a view taken on the line 7—7 of FIGURE 3.

Referring in greater detail to the drawings in which like numerals indicate like parts throughout the several views, the reference numeral 10 designates generally an automobile body rear portion. The body portion 10 is provided with a trunk compartment 12 open at the top and open at one end and including a floor 14. Opposed side walls 16 and 18 rise from the floor 14 and include spaces for the wheels (not shown) of the vehicle rear portion 10.

The article carrier of the present invention is designated generally by the reference numeral 20 and is normally nested within the compartment 12 and is shiftable along the floor 14 from the nested position, in FIGURE 1, out of the open end of the compartment 12 to an extended position, FIGURE 2.

The article carrier 20 includes a front panel 22 which closes the open end of the compartment 12 when the carrier 20 is in the nested position. The front panel 22 is connected along its lower end by a hinge 24 to the rearward end of a floor panel 26 for movement from the upstanding position shown in full lines in FIGURE 2 to the lay-down horizontal position shown in dotted lines.

Wall panels 28 and 30 rise from the side edges of the floor panel 26 of the carrier 20 and have their upper ends below and adjacent to the upper ends of the adjacent compartment side walls 16 and 18, respectively.

A pair of doors 32 and 34 are arranged in edge-to-edge relation and normally extend over and close the open top of the compartment 12. The doors 32 and 34 are independently swingable from the closing position to a position projecting out of the open top of the compartment 12, as shown in FIGURE 2.

Hinge members 36 connect each of the doors 32 and 34 to the compartment side walls 16 and 18 for swinging movement of the doors 32 and 34. Means is provided connecting the floor panel 26 to the floor 14 for shifting movement thereover. This means is seen most clearly in FIGURE 5 and consists in supporting rollers 38 carried in brackets 40 which depend from the under face of the floor panel 26 and guide rollers 42 which roll in channel-shaped trackways 44 provided on the under face of the floor panel 26, the guide rollers 42 being supported on brackets 46 which are carried on the upper face of the floor 14.

The rearward end edges of the doors 32 and 34 are provided with a recessed portion, as at 48 in FIGURE 3, sealingly receiving the upper end of the carrier front panel 22 when the carrier 20 is in the nested position and the doors 32 and 34 are in the position extending over the open top of the compartment 12.

Telescopingly arranged brace members 50 and 52 extend between each of the doors 32 and 34 and a mid part of the body 10 and serve to hold the doors 30 and 32 in the upright position, as shown in FIGURE 2.

A spring biased rod 54 is slidably mounted upon the one door 32 and has its forward end portion received in an appropriately shaped recess provided in the body portion 10 as indicated by the numeral 56 in FIGURE 3. A handle 58 is provided on the other end of the rod 54 and is accessible to an individual when opening the compartment 12 for extending the carrier 20 from a nested position to the extended position.

Latch means is provided on the carrier panel 22 for securing the carrier 20 in the nested position. This latch means includes a handle 60 exteriorly of the panel 22 operatively connected to a hook 62 on the internal wall of the panel 22, the hook 62 engaging a keeper 64 (FIGURE 7) provided in the rearward edge portion of the door 32, as shown in FIGURE 4.

Cooperatively arranged with respect to a pair of latch elements 66 in the compartment side walls 16 and 18 are actuator rods 68 and 70 operatively connected to the handle 60.

Each latch element 66 consists in a leaf spring 72 (FIGURE 6) carrying a pin 74 receivable in an appropriately spaced hole 76 provided in the adjacent carrier wall panels 28 and 30. One end of each of the actuator rods 68 and 70 is engageable with the free end of the adjacent pin 74 and serves, when the handle 60 is turned, to push the adjacent pin 74 out of the latching hole in the carrier wall panels 28, 30. Other holes 78 are provided in the wall panels 28 and 30 receiving the pins 74 of the latch elements 66 when the carrier 20 is in the extended position as shown in FIGURE 2, only the hole 78 in the wall panel 28 being illustrated.

Brace means is provided for holding the carrier front panel 22 in the horizontal lay-down position shown in FIGURE 4 in dotted lines. This brace means consists in a bar element 80 pivotally connected to the inner wall of the panel 22 and slidably mounted in a bracket 82 provided on each of the compartment side walls 16 and 18 adjacent the rearward end of the latter. A clip 84 on the inner wall of each of the compartment side walls 16 and 18 receives the free end of the adjacent bar element 80 and holds the carrier front panel 22 in the position closing the open end of the compartment 12.

An apron 86 is disposed horizontally below the hinge 24 and is fixedly carried on the carrier floor panel 26 so that it completes the appearance of the rearward portion of the automobile body portion 10 when the compartment 12 is closed by the doors 32 and 34 and the carrier 20 is in the nested position.

In use, the automobile body portion 10 is readily adapted for receiving the carrier 20 by removing therefrom the trunk lid cover of conventional construction and design. The carrier 20 is easily inserted into the compartment 12 and brackets 46 secured to the floor 14 of the compartment 12 so that the rollers 42, together with the rollers 38, make it easy to shift the carrier 20 along the floor 14 from the nested position to the projected position partially out of the compartment 12.

Doors 32 and 34 are easily and with facility installed over the open top of the compartment 12 with springs 89 biasing the hinge members 36 to the open position in order to assist in the raising of the doors 32 and 34 when it is desired to open the top of the carrier 20.

When it is desired to shift the carrier 20 from the nested position to the extended position, the handle 60 is manually rotated to disengage the hook 62 from the keeper 64 and at the same time to withdraw the free ends of the actuator rods 68 and 70 from the holes 88 in the one leg of the angle iron member 90 on each of the body side walls 16 and 18 and to apply pulling pressure to the carrier 20 so that as the carrier 20 is moved to its projected position, the pins 74 of the latch elements 66 enter the holes 78 provided in the carrier wall panels 28 and 30.

The compartment doors 32 and 34 are next raised to the vertical positions and the brace members 50 and 52 latched relative to each other by conventional means here shown as not being a part of the present invention.

The automobile body 10 may be provided at the factory with the doors 32 and 34 and with the end gate or panel 22, and the carrier purchased separately and installed by the purchaser. In such a case, provision should be made for hingedly connecting the panel 22 to the compartment floor 14.

What is claimed is:

1. The combination with a vehicle body trunk compartment open at the top and at one end and including a floor and opposed side walls rising from said floor, of an article carrier including a floor panel and a wall panel rising from each side edge of said floor panel nested within said compartment with the upper end of each wall panel below and adjacent to the upper end of the adjacent compartment side wall, means embodying rollers rollably engaging said floor panel and said floor connecting said floor panel to said floor for movement along said floor from the nested position out of the open end of said compartment to an extended position, said carrier having a front panel closing the open end of said compartment when in the nested position, said front panel being hingedly connected along its lower end to said floor panel for movement from the compartment end closing position to a lay-down position when said carrier has been shifted to the extended position, brace means operatively connected to said front panel and the compartment side walls for holding said front panel in the lay-down position, a pair of doors arranged in edge-to-edge relation and normally extending over and closing the open top of said compartment, each of said doors being hingedly connected to the upper end portion of the adjacent side wall and being independently swingable to a position projecting out of the open top of said compartment, and spring means operatively connected to each of the hinge connections of said doors to thereby assist the doors toward the projected positions.

2. The combination according to claim 1, wherein said brace means comprises a bar element slidably mounted in a bracket provided on each of the compartment side walls and having one end pivotally connected to said front panel, the other end of each of said bar elements being releasably received in a hook provided on the adjacent compartment side wall when the front panel is in the closing position and the other end of each of said bar elements being released from each hook and the bar elements being slidable along said brackets when the front panel is moved to the lay-down position.

3. The combination according to claim 1, which includes in addition latch means actuable exteriorly of said front panel and operatively connected to said compartment side walls for securing said carrier in the nested position.

References Cited in the file of this patent

UNITED STATES PATENTS

| | | |
|---|---|---|
| 1,452,394 | Simon | Apr. 17, 1923 |
| 1,588,740 | Johnson | June 15, 1926 |
| 1,632,672 | Obergfell | June 14, 1927 |
| 2,284,419 | Greig | May 26, 1942 |
| 2,509,665 | Apel | May 30, 1950 |
| 2,576,385 | Bigsby | Nov. 27, 1951 |

FOREIGN PATENTS

| | | |
|---|---|---|
| 1,030,705 | Germany | May 22, 1958 |